United States Patent Office 3,376,351
Patented Apr. 2, 1968

3,376,351
PROCESS FOR PRODUCING METHOXYPHENOL OR ETHOXYPHENOL
Garabed Amedjian, Noël Crenne, and Jacques Eugene Gabriel Morel, Lyon, France, assignors to Rhone-Poulenc S.A., Paris, France, a French body corporate
No Drawing. Filed Apr. 6, 1966, Ser. No. 540,489
Claims priority, application France, Apr. 9, 1965, 12,681
7 Claims. (Cl. 260—613)

ABSTRACT OF THE DISCLOSURE

Methoxyphenol and ethoxyphenol are prepared by oxidizing anisole or phenetole with an unsubstituted alkanoic acid having 1–4 carbon atoms and discontinuing reaction when not more than 6% of the anisole or phenetole has been oxidized.

---

The present invention relates to the oxidation of anisole or phenetole to methoxyphenol or ethoxyphenol respectively.

Numerous attempts have been made to introduce a hydroxyl group into phenol ethers by oxidation. Thus, Fernholz [Chem. Ber. 84, 110, (1951)] studied the oxidation of phenol ethers with perbenzoic, perphthalic or peracetic acids, in chloroform and in benzene (or water in the case of peracetic acid). The reaction produced quinones.

It has also been proposed to react perbenozic acid with methyl ethers of hydroquinone, of phloroglucinol, of pyrogallol, and of resorcinol or with veratrole or anisole, in chloroform as solvent. The ethers of the polyphenols gave quinones as the only products which could be isolated. Veratrole was oxidised with opening of the aromatic ring, to give methyl muconate, and anisole did not give any product which could be isolated. In each case the oxidation did not introduce a new phenolic group [Friess et al., J. Amer. Chem. Soc., 74, 1305, (1952)].

Fernholz et al. [Chem. Ber., 87, 578, (1954)] also suggested oxidising α- and β-methoxynaphthalene at 40° C. with performic acid prepared in situ by introducing a solution of hydrogen peroxide in formic acid into a solution of the phenolic ether in formic acid. Only the products of oxidative dimerisation were obtained (e.g. 4,4'-dimethoxy-1,1-dinaphthyl). An attempt to oxidise anisole under identical conditions did not lead to guaiacol being obtained.

Davidge et al. (J. Chem. Soc., 1958, 4569) oxidised numerous phenolic ethers, including anisole, with peracetic acid produced in situ by the addition of hydrogen peroxide to a solution of the ether in glacial acetic acid. Only quinones were obtained. In the case of anisole, the reaction lead to water-soluble products.

McClure et al. [J. Org. Chem., 27, 627–8 (1962)] oxidised anisole and diphenyl ether in methylene chloride with trifluoroperacetic acid. Phenolic groups were introduced, but only in low yield. In the case of anisole, a mixture of isomeric methoxyphenols was obtained in a yield of 34%. The preparation of trifluoroperacetic acid is, moreover, dangerous and can give rise to explosions.

In all cases mentioned above the amount of peracid employed is a molar excess relative to the phenol ether in order to ensure complete oxidation.

It has now been found that methoxyphenols and ethoxyphenols, more particularly guaiacol and guaethol, are obtained in good yields by the oxidation of anisole or phenetole respectively with an unsubstituted alkanoic peracid of 1 to 4 carbon atoms, when the reaction is discontinued when at most 6% by weight of the anisole or phenetole has been oxidised. Working in this way yields of 80.2% of methoxyphenols (60.1% of guaiacol) based on the anisole converted, and yields of 42.4% of ethoxyphenols (29.1% of guaethol) based on the phenetole converted, can be obtained.

If the degree of conversion exceeds 6%, the yield decreases very rapidly and considerable quantities of non-volatile products, phenols and acidic products are formed.

The preferred peracid is performic or peracetic acid. They may be used as solutions in inert solvents such as ethyl acetate, or prepared in situ by any known method.

A preferred method of preparing the peracids in situ consists in reacting an aliphatic acid of 1 to 4 carbon atoms with hydrogen peroxide in the phenolic ether which is to be oxidised. For this, it is possible either to introduce the hydrogen peroxide into a solution of the aliphatic acid in the ether heated to a suitable temperature, or progressively to introduce a solution of the aliphatic acid in hydrogen peroxide into the ether heated to a suitable temperature. The concentration of the acid should be between 1 and 20% by weight based on the phenolic ether. The concentrations of the acid and the hydrogen peroxide used are not, however, critical.

According to another method, the peracid is obtained in situ by oxidation of an aldehyde of 1 to 4 carbon atoms with pure oxygen or an oxygen-containing gas in the presence of ultraviolet radiation, to give and aldehyde peralkanoate which decomposed under the reaction conditions into the peracid which is immediately used to oxidise the phenol ether. To implement such a method, a current of inert gas (for example nitrogen) saturated with aldehyde vapour by passage through the latter, and a current of oxygen-containing gas, are simultaneously introduced into the phenol ether, heated to a suitable temperature and having a source of ultraviolet radiation immersed in it. The presence of a small amount of water (about 1% based on the phenolic ether) assists the reaction.

The reaction temperature is generally between 50 and 130° C. and is preferably 110° C. at normal pressure. The use of pressure allows working at temperatures above 130° C.

Whatever method of oxidation is used, the methoxy- or ethoxy-phenols obtained are removed from the reaction mixture as their alkali metal phenates, and are then liberated by acidification. With the guaiacol and guaiethol, a small amount of para-isomers is produced as useful by-product. p-Methoxyphenol can be, for example, used as an anti-oxidant in plastic materials, and as an intermediate in organic synthesis. The unconverted anisole or phenetole which is recovered may be used for a second oxidation process without redistillation.

The working conditions and the reagents used are especially well suited to continuous operation of the process.

The invention is illustrated by the following examples.

EXAMPLE 1

A 1-litre, three-necked flask equipped with a stirrer, a reflux condenser, a dropping funnel, a sampling tube, a temperature-controlled heating unit and a nitrogen inlet, is charged with 300 cm.³ of anisole (298 g., 2.75 moles) and 50 cm.³ of 100% acetic acid (52.5 g.). A stream of nitrogen is passed through the flask, the stirrer is started, and the mixture then heated to 110° C. 5.86 g. of 34.09% w./w. hydrogen peroxide (2 g. of $H_2O_2$, 0.058 mole) are then added over the course of 60 minutes. The temperature is kept at 110° C. and stirring is continued. The hydrogen peroxide in the reaction mixture is periodically measured, and the results of the measurements are given in the table below:

| Time after completion of addition of H₂O₂ | Amount of H₂O₂ | |
| --- | --- | --- |
| | In g. | As a percentage of the reaction mixture |
| 15 min | 1.52 | 0.42 |
| 2 hr | 0.79 | 0.22 |
| 3 hr | 0.54 | 0.15 |
| 4 hr | 0.36 | 0.10 |
| 5 hr | 0.22 | 0.06 |

After 5 hours at 110° C., the reaction mixture is cooled and the acetic acid removed by distillation at 50 mm. Hg pressure. 80 cm.³ of a fraction consisting of a mixture of water, acetic acid and anisole are obtained. The distillation residue is stirred at 25° C. with 100 cm.³ of 5% caustic soda solution. The aqueous layer is separated from the organic layer. The latter is washed with 50 cm.³ of distilled water, and the wash water is combined with the aqueous alkaline layer.

The anisole present in the aqueous phase is extracted twice with diethyl ether, 50 cm.³ each time. The aqueous phase containing the phenolic products is then treated with excess carbon dioxide, and the phenolic products are extracted with ether (3×50 cm.³). The ethereal extracts are dried over anhydrous sodium sulphate, and the ether is evaporated on a water bath with reduction of pressure until a constant weight residue has been obtained. 4.04 g. of residue are obtained, which, by vapour phase chromatography, is found to contain phenol, 2%; guaiacol, 79% (3.19 g.); and p-methoxyphenol, 19% (0.76 g.).

From the disstilled anisole/water mixture, the organic layer from the alkaline extract of the distillation residue, and the various wash waters, 281.45 g. of anisole are recovered. Additionally, 11.55 g. of anisole are recovered from the various test samples taken during the course of the oxidation. A total of 5 g. (0.046 mole) of anisole has therefore been used up. The recovered anisole may be recycled.

The total yield of methoxyphenols based on the anisole used up is 69%, and the yield of guaiacol is 55.6%.

EXAMPLE 2

A 6-litre flask equipped with a stirrer, a heating system, a dropping funnl, a Vigreux column, a decantation analyser, a reflux condenser and a receptacle, was charged with 3000 g. of anisole (27.7 moles), the temperature of which was raised to 110° C. A mixture of 200 g. of 99.7% formic acid and 65 g. of 130 volume (34.5%) hydrogen peroxide (22.4 g. of H₂O₂, 0.65 mole) was then slowly added to the flask, with stirring. The addition took 60 minutes. The temperature fell from 110 to 103° C. Heating was regulated to give a gentle reflux, and was maintained for 3 hours. The water and formic acid were driven off by distillation at normal pressure (vapour temperature, 149° C.).

The residue was cooled to 60° C. and treated first with 250 cm.³ of 15% caustic soda solution, and then with 200 cm.³ of 10% caustic soda solution, with stirring, over the course of 30 minutes. The mixture was allowed to separate for 30 minutes and the aqueous alkaline phase withdrawn. This aqueous layer was acidified with 50% sulphuric acid to liberate the phenolic products. The latter were extracted by successively washing with 200, 100 and 100 cm.³ of benzene. The benzene was driven off the combined extracts by distillation at normal pressure, and the concentrate then distilled at a pressure of 3 mm. Hg until a temperature of 150° C. in the material and 110° C. in the vapour had been reached.

A 57.6 g. fraction was collected containing the following constituents, determined by vapour phase chromatography: anisole, 0.68%; phenol, 0.49%; guaiacol, 74.05%; and p-methoxyphenol, 24.78%.

The following amounts of anisole were recovered: 263.3 g. from the fraction resulting from the distillation of the fomic acid; 1.8 g. from the fraction resulting from the distillation of the benzene; and 2673 g. from the organic layer resulting from the treatment of the formic acid distillation residue with caustic soda.

In total, 2938 g. of anisole were recovered and 62 g. (0.57 mole) were consumed in the reaction. The yield of guaiacol based on the anisole consumed is thus 60.1%, the yield of p-methoxyphenol is 20.1%, and the yield of all methoxyphenols is 80.2%. 98% of the formic acid employed was recovered.

The following comparison experiment was carried out using the method of Fernholz et al. Chem. Ber., 87, 578 (1954). 3.24 g. (0.03 mole) of anisole and 150 cm.³ of 99% formic acid were charged into a 3-necked 500 cm.³ flask equipped with a stirrer, a thermometer, a reflux condenser, and a temperature-controlled heating unit.

The mixture was heated to 40° C. and a solution of 2.9 cm.³ of 39% weight/weight hydrogen peroxide (0.033 mole of H₂O₂) in 50 cm.³ of formic acid was run in over the course of 90 minutes. The mixture was stirred for 15 minutes at 40° C. after the end of the addition, and then cooled to 25° C. and left at that temperature for 15 hours. A strongly coloured homogeneous solution was obtained. 0.13% of peracid, expressed as H₂O₂, remained in the reaction mixture. This was destroyed by adding the theoretical amount of bisulphite, and the formic acid was then removed by distillation at 20 mm. A residue was obtained which was treated with excess of dilute caustic soda. The aqueous layer was separated and extracted with ether. The ether was driven off on a water bath. 0.091 g. of a coloured residue which did not contain anisole was obtained. The aqueous alkaline layer was acidified with carbon dioxide to liberate the phenolic products. The mixture was extracted with ether, and the extract dried over anhydrous sodium sulphate and evaporated to constant weight. 0.251 g. of residue was obtained and analysis of this by vapour phase chromatography showed evidence of traces of guaiacol. The aqueous mother liquors from this second treatment were acidified by adding excess hydrochloric acid. The mixture was extracted with ether, and the extract dried and evaporated as before. 0.223 g. of an acid residue were obtained. The anisole was completely used up, and phenolic products amounting to only 6.7% of the theoretical amount (expressed as guaiacol), were obtained in which only traces of guaiacol could be detected.

EXAMPLE 3

A 10.7% solution of peractice acid in ethyl acetate was prepared by pyrolysing a 21% solution of acetaldehyde peracetate in ethyl acetate at 100° C., at a pressure of 60–100 mm. of mercury.

595.6 g. (5.5 moles) of anisole and 6 cm.³ of water were charged into a 3-necked 2-litre flask equiped with a stirrer, a dropping funnel cooled by circulating water at 1° C. through a double jacket, a reflux condenser, a nitrogen inlet, and a sampling tube. The stirrer was started and the temperature of the mixture raised to 110° C. 112 cm.³ of the 10.7% solution of peracetic acid, prepared as described above, (12 g. of pure peracetic acid, 0.15 mole), were added over the course of 70 minutes. During the addition the temperature of the reaction mixture fell to 107° C. (because of reflux of the ethyl acetate/anisole mixture). The reaction mixture was kept at this temperature for 30 minutes after the addition was complete. Determination of the peracetic acid remaining in the reaction mixture showed that it had been completely used up. The ethyl acetate and acetic acid were removed in a 70 mm. vacuum. A 10 cm.³ fraction containing a little anisole was collected.

The distillation residue was refluxed for 1 hour with 200 cm.³ of 5% caustic soda. The mixture was cooled to 25° C., the aqueous alkaline layer was separated, and the organic layer washed with 100 cm.³ of water. The alkaline layer and the wash waters were combined. The combined solutions were extracted twice, with 50 cm.³ of ether each time, to remove all traces of anisole. The aqueous alkaline solution was treated with excess carbon dioxide to liberate the phenolic products and then extracted twice with 100 cm.³ of ether. The ether solution obtained was dried over anhydrous sodium sulphate and then evaporated on a water bath. The residue was dried to constant weight in vacuo. 13.14 g. of a residue were obtained, shown by vapour phase chromatography to contain phenol, 3%; guaiacol, 75% (9.85 g.); and p-methoxyphenol, 22% (2.70 g.).

The anisole was recovered by distillation, at normal pressure, of the mixture obtained by adding the distillation fraction, which had been freed of acetic acid by washing with sodium bicarbonate, to the organic phase obtained after washing the distillation residue with caustic soda. 570.8 g. of pure anisole were obtained. The weight of anisole consumed was 24.8 g. (0.23 mole).

The yield of guaiacol based on anisole consumed was 34.8%; and the yield of total methoxyphenols was 44%.

EXAMPLE 4

300 cm.³ of anisole (2.75 moles) were charged into a 1500 cm.³ Keller flask equipped with a thermometer, a tube for withdrawing samples, a solid carbon dioxide condenser, a stirrer with air passing in through the shaft of the stirrer, an inlet for nitrogen and acetaldehyde, and heated by a temperature-controlled oil bath. The equipment was then purged with nitrogen. A 70-watt ultraviolet lamp surrounded by a quartz cooling jacket was immersed in the anisole, and was turned on when the temperature of the anisole reached 110° C. A stream of air, and a stream of nitrogen saturated with acetaldehyde by passage through a vessel containing 29.6 g. of acetaldehyde maintained at 0° C., were then introduced simultaneously, with stirring, into the liquid mass. A delivery rate of 5 l./h. was maintained for 7 hours. The reflux temperature was about 107° C. The peroxide (peracetic acid) content remained less than 1% throughout the reaction. The reaction mixture was then cooled. 17.43 g. of acetic acid and 11.38 g. of acetaldehyde were found to be in the flask, and were removed by distillation in a 100 mm. Hg vacuum. An 80 cm.³ fraction was collected.

The distillation residue was worked up as in Example 1 and the various products recovered as above. The reaction balance was found to be as follows: acetaldehyde consumed, 14.92 g.; anisole recovered, 291 g.; anisole consumed, 6.9 g. (0.063 mole); phenolic products, 5.9 g. vapour phase chromatography of which showed a content of: phenol, 4.4%; guaiacol, 77.8% (4.6 g.); p-methoxyphenol, 17.8% (1.05 g.). The yield of guaiacol based on anisole consumed was thus 58.2%, and the yield of all methoxyphenols was 74.6%.

EXAMPLE 5

The oxidation of phenetole was carried out in the equipment of Example 2, under the conditions and with the results listed in the following table:

| | |
|---|---|
| Weight of phenetole introduced _____g__ | [1] 3000 |
| Weight of formic acid introduced _____g__ | 200 |
| Weight of 120 volume (34.5%) hydrogen peroxide _____g__ | [2] 65 |
| Duration of addition of the HCOOH/H₂O₂ mixture _____min__ | 60 |
| Duration of reaction _____hours__ | 3 |
| Temperature at the beginning of the addition, ° C. | 115 |
| Temperature at the end of the reaction, ° C. ____ | 107 |
| Phenetole recovered _____g__ | 2920 |
| Phenetole consumed _____g__ | [3] 80 |
| Weight of phenolic fraction obtained _____g__ | 71 |

Composition of the phenolic fraction:
| | |
|---|---|
| Phenol _____percent__ | 46.08 |
| Phenetole _____do____ | 1.42 |
| Guaethol _____do____ | 36.88 |
| p-Ethoxyphenol _____do____ | 15.63 |

Yields based on the phenetole consumed:
| | |
|---|---|
| Guaethol _____percent__ | 29.1 |
| p-Ethoxyphenol _____do____ | 12.3 |
| All ethoxyphenols _____do____ | 41.4 |

[1] 24.5 moles.
[2] 22.4 g. of H₂O₂, 0.65 mole.
[3] 0.66 mole.

We claim:
1. Process for producing methoxyphenol or ethoxyphenol which comprises oxidising anisole or phenetole respectively at a temperature up to 130° C. with an unsubstituted alkanoic peracid of 1 to 4 carbon atoms, discontinuing the reaction when at most 6% by weight of the anisole or phenetole has been oxidised, and isolating the methoxyphenol or ethoxyphenol produced.

2. Process according to claim 1, in which the oxidation is effected at 50° to 130° C.

3. Process according to claim 1, in which the peracid is performic acid.

4. Process according to claim 1, in which the peracid is peracetic acid.

5. Process according to claim 1, in which the peracid is produced in situ by oxidation of the corresponding carboxylic acid with hydrogen peroxide.

6. Process according to claim 1, in which the peracid is produced in situ by oxidation of the corresponding aldehyde with oxygen in the presence of ultraviolet radiation.

7. Process according to claim 1, in which the reaction mixture contains about 1% by weight of water.

References Cited

UNITED STATES PATENTS 2,697,732   12/1954   Mavity _____ 260—613

OTHER REFERENCES

Heslop et al., Jour. Chem. Soc. (London) (1954), pages 1271–1273.

BERNARD HELFIN, *Primary Examiner.*